United States Patent Office 3,512,940
Patented May 19, 1970

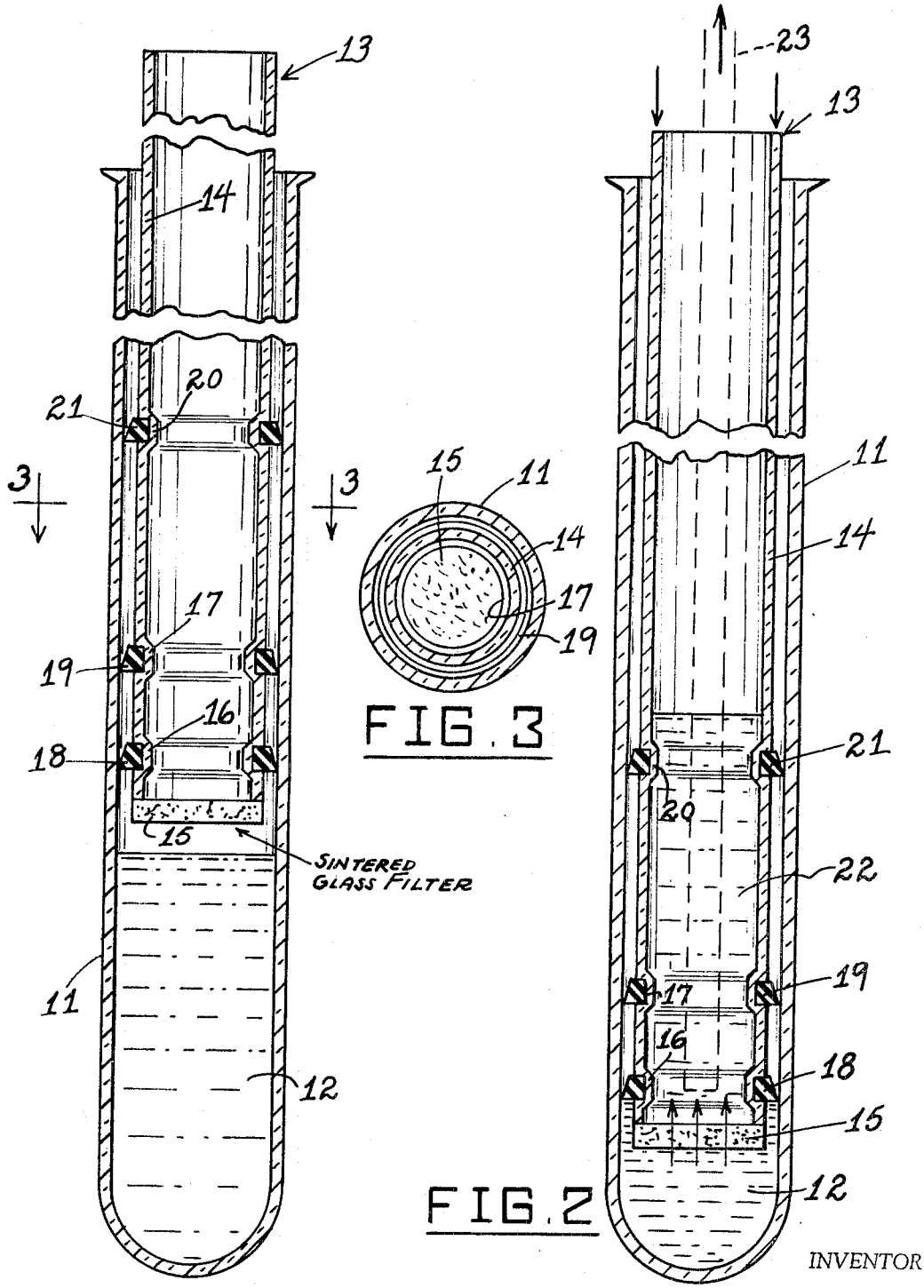

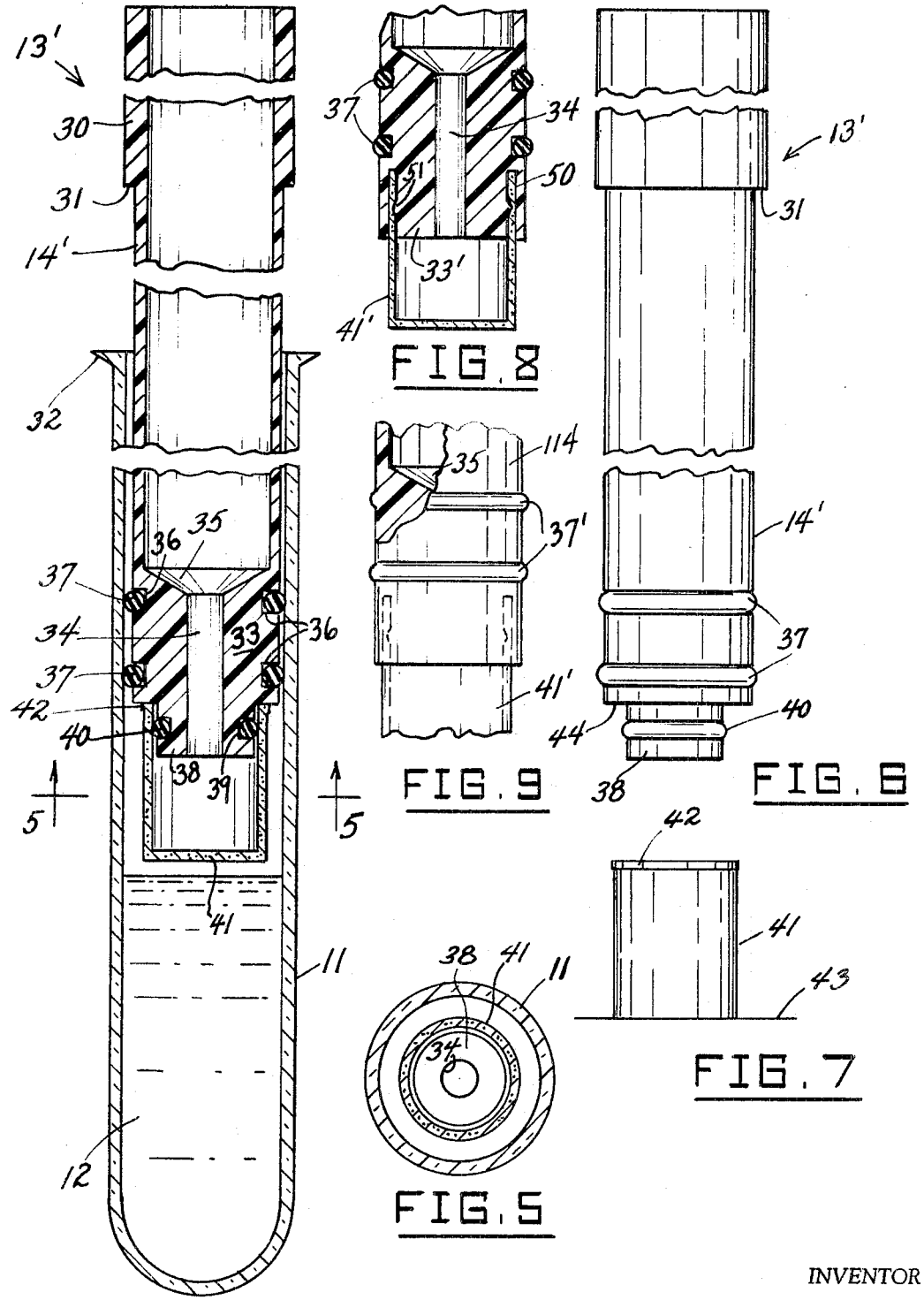

3,512,940
TEST TUBE FILTER DEVICE
Justin J. Shapiro, % Labindustries, 1802 2nd St., Berkeley, Calif. 94710
Continuation-in-part of application Ser. No. 629,302, Apr. 7, 1967. This application Dec. 30, 1968, Ser. No. 797,314
Int. Cl. B01d 33/00; B67d 5/58
U.S. Cl. 23—259
20 Claims

ABSTRACT OF THE DISCLOSURE

A pressure or vacuum filter device to be used in a test tube. The device consists of a hollow plunger acting as a piston. The plunger has a porous bottom portion serving as a filter. When a precipitate is formed in a test tube, the plunger is inserted and forced down. The filtrate is forced into the hollow plunger, from which it can be removed for further tests. In a reverse procedure liquid in the plunger can be filtered into the test tube by vacuum action induced by raising the plunger in the test tube.

---

This is a continuation-in-part of my prior application, Ser. No. 629,302, filed Apr. 7, 1967, and now abandoned, and entitled "Test Tube Filter Device."

This invention relates to laboratory manipulative apparatus, and more particularly to a filter press accessory to be used in a test tube to quickly extract filtrate from the test tube when a precipitate is formed therein.

A main object of the invention is to provide a novel and improved filter press accessory for use in a test tube, said filter press accessory being very simple in construction, being easy to operate, and enabling filtrate to be quickly removed from a test tube for further testing after a precipitate is formed in the test tube, or whenever it is desired to extract a filtrate from liquid substance in a test tube.

A further object of the invention is to provide an improved filter press accessory for a test tube, said filter press accessory being inexpensive to manufacture, being easy to clean, and being durable in construction.

A still further object of the invention is to provide an improved device for instantly filtering material in a test tube under pressure so as to extract a filtrate therefrom without the necessity of pouring the contents of the test tube through an external filter system or resorting to mechanical procedures such as centrifuging, the device saving considerable time in testing, since an aliquot of filtrate may be removed from the test tube as soon as the filtrate liquid becomes available in the tube instead of consuming the time required for conventional filtering or centrifuging.

A still further object of the invention is to provide an improved device adapted to be employed in conjunction with a test tube for filtering material, namely, for separating filtrate from the remaining portion of a quantity of liquid containing a precipitate or the like, the device being usable either by exerting mechanical pressure on the material to force the filtrate through a filter element forming part of the device, or in a manner to urge the filtrate through the filter element by suction, whereby the device has a large range of uses and is more flexible than filter arrangements and devices heretofore employed.

A still further object of the invention is to provide an improved filter device adapted to be employed with a test tube and employing a removable porous filter element which can be readily mounted on the device, which can be quickly installed on the device without the necessity of handling the filter element, and which is locked to the device by merely exerting downward vertical force on the device with the device located over the filter element in a position to engage with said filter element.

Further objects and advantages of the invention will become apparent from the following description and claims, and from the accompanying drawings, wherein:

FIG. 1 is a vertical cross-sectional view taken through a test tube containing liquid material to be filtered, with a pressure-filtering accessory according to the present invention shown inserted therein preparatory to extracting filtrate from the liquid material.

FIG. 2 is a vertical cross-sectional view similar to FIG. 1, showing the pressure filtering device in depressed position, whereby the filtrate is forced through the porous bottom wall of the device into its interior, from which it may be removed by means of an aspirating tube, shown in dotted view.

FIG. 3 is a horizontal cross-sectional view taken substantially on line 3—3 of FIG. 1.

FIG. 4 is a vertical cross-sectional view similar to FIG. 1 but showing a modified form of filtering device according to the present invention.

FIG. 5 is a horizontal cross-sectional view taken substantially on line 5—5 of FIG. 4.

FIG. 6 is an elevational view of the main portion of the filtering device of FIG. 5, with its porous filter cup removed.

FIG. 7 is an elevational view of a filter cup adapted to be lockingly engaged with and to be used with the main portion of the device shown in FIG. 6 to form the assembly shown in FIG. 4.

FIG. 8 is a fragmentary vertical cross-sectional view taken through the lower end portion of a further modified form of filtering device according to the present invention.

FIG. 9 is a fragmentary elevational view, partly in cross-section, showing a still further modified form of filtering device according to the present invention.

Referring to the drawings, 11 designates a conventional test tube containing a quantity of liquid material 12. The liquid material may be undergoing chemical action resulting in the formation of a precipitate, or may be any other liquid material from which it is desired to extract an aliquot of filtrate for further testing.

Designated generally at 13 is a filter press accessory according to the present invention. The device 13 comprises a tubular main body 14 somewhat smaller in outside diameter than the inside diameter of the test tube 11 and adapted to be telescopically received therein. The tubular body 14 has a disc 15 of solid porous material, such as sintered glass, cemented or otherwise rigidly secured to its bottom end, defining a filter element. Adjacent to its bottom end, the tubular body 14 is formed with a pair of relatively closely spaced inwardly deformed channels 16 and 17 containing resilient deformable sealing rings 18 and 19 adapted to make sealing sliding contact with the interior wall surface of the test tube 11. A substantial distance above the channel 17 the tubular body 14 is formed with at least one additional inwardly deformed channel 20 containing another resilient deformable sealing ring 21 also adapted to make sealing sliding contact with the inside surface of the test tube 11. The upper sealing ring 21 acts not only as a sealing means but also as a supporting and aligning means to maintain the tubular body 14 substantially in coaxial relationship with the test tube.

The rings 18, 19 and 21 may be made of any suitable resilient deformable material such as rubber, Neoprene, or the like. The rings preferably have a generally trapezoidal cross-section with their inner walls vertical and their outer surfaces flaring downwardly, as shown, to provide a close and effective seal and to effectively transmit pressure downwardly against the liquid in the test tube when the device is depressed in the test tube in the manner shown in FIG. 2.

In operation, the device 13 is inserted in the test tube 11 in the manner shown in FIG. 1 and is depressed therein in the manner shown in FIG. 2, whereby the filtrate, shown at 22, is forced upwardly through the porous disc 15 into the interior of the tubular body 14. An aliquot of filtrate 22 may then be quickly removed for further testing in any suitable manner, for example, through an aspirating tube 23, shown in dotted view.

The use of the device 13 in the manner above described makes it possible to take an aliquot of filtrate for further testing as soon as it becomes available in the test tube, for example, as soon as a precipitate is formed in the liquid material 12, instead of wating until the liquid material can be poured through a conventional filter system or can be centrifuged, whereby a great saving in time can be realized.

In the embodiment of the invention illustrated in FIGS. 4 to 7, the filter device is designated generally at 13'. The device 13' comprises a tubular main body 14' whose major portion is somewhat smaller in outside diameter than the inside diameter of the associated test tube 11 so as to be telescopically receivable therein. The upper portion of the main body is thickened, as shown at 30, so as to define an external downwardly facing shoulder 31 engageable with the top rim 32 of the test tube and so as to limit descent of said main body therein, for a reason presently to be explained.

The main body 14' has a relatively thick bottom portion 33 provided with the axial bore 34. The top surface of the bottom portion 33 comprises a funnel-shaped frustoconical cavity 35 leading to bore 34, facilitating the cleaning of the interior of the body.

Bottom portion 33 is formed with vertically spaced annular grooves 36, 36 containing resilient deformable O-rings 37, 37 which are sealingly and slidably engageable with the interior wall surface of the test tube 11, in the same manner as the rings 18, 19 and 21, previously described.

The bottom portion 33 is formed with an integral reduced depending axial stud portion 38 provided with an annular groove 39 containing a resilient deformable O-ring 40. The stud portion 38 with its O-ring 40 is lockingly engaged in the top portion of a cylindrical cup member 41 of porous, somewhat yieldable material, such as polyethylene, or the like. Said cup member 41 may be provided with an integral reinforcing top rim flange 42, if so desired.

The cup member 41 has a wall thickness making it sufficiently stiff as to allow the stud portion 38 with its locking ring 40 to be forced into the cup member by downward vertical movement of main body 14'. Thus, with the cup member 41 resting on a horizontal supporting surface 43, as shown in FIG. 7, the body 14' may be moved vertically downwardly in a single stroke to engage the stud portion 38 in the cup, with said stud portion forced fully into the cup member so that the top rim 42 abuts the annular bottom shoulder 44 defined at the top end of stud portion 38, namely, to the working position of the cup member shown in FIG. 4. This enables a filter cup 41 to be operatively secured to the main body 14' without the necessity of handling the filter cup. Thus, for example, a filter cup 41 can be extracted from a sterile container or carton and be secured to the main filter body 14' in the manner above described without any risk of contaminating the filter cup.

With the filter cup 41 frictionally locked on stud portion 38 as above described, the device 13' may be inserted in the test tube 11 containing the liquid material 12 to be filtered and may be manipulated in the same manner as described in connection with the embodiment of FIGS. 1 to 3. The shoulder 31 limits the descent of main body 14' in the test tube to prevent crushing the filter cup 41 against the bottom of the test tube.

The device may be employed in a reverse manner, namely, as a suction filter device. Thus, the liquid to be filtered may be poured into the main body 14 or 14', with the main body substantially in its fully lowered position in the test tube and the main body may be then pulled upwardly in the test tube, developing vacuum in the bottom of the test tube therebeneath, which induces filtering action by suction. The filtrate is thus drawn by suction through the porous bottom wall element 15 or 41 of the tubular filter body 14 or 14'.

In the arrangement illustrated in FIGS. 4 to 7, the filter cup member is shown as being sealingly locked to the main body 14' by tightly receiving the stud portion 38 and its locking and sealing ring 40. Other possible securing and sealing arrangements may be employed within the spirit of the present invention. For example, the porous filter cup, shown at 41' in FIG. 8, may have its top portion lockingly received in a downwardly facing annular locking groove or recess 50 provided in the thickened lower end portion of the plunger body, shown at 33'. The inner wall of the recess 50 may be integrally formed with an annular locking rib 51 which grips the filter cup wall after said filter cup wall has been forced into the recess to the working position of the filter cup shown in FIG. 8.

As shown in FIG. 9, the O-rings 37, 37 may be replaced by integral sealing ribs 37', 37' provided on the plunger body, shown at 114. This is quite feasible, especially if said body is made of somewhat yieldable material, such as molded polypropylene material. In fact, if the plunger is designed to have a sufficiently close fit in the test tube 11, the sealing ribs may be eliminated entirely, and a smooth plunger may be employed.

While certain specific embodiments of an improved filtering accessory for use with a test tube have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A test tube filter device comprising a tubular body adapted to be telescopically inserted in a test tube, a lower imperforate wall portion made of porous material on said tubular body, and sealing means on the body above said imperforate wall portion adapted to make sealing and sliding contact with the inside surface of the test tube.

2. The filter device of claim 1, and wherein said porous wall portion comprises a rigid bottom disc of porous material.

3. The filter device of claim 1, and wherein said porous wall portion comprises a flat bottom disc of sintered glass material.

4. The filter device of claim 1, and wherein said sealing means comprises at least one resilient deformable sealing ring mounted on the tubular body.

5. The filter device of claim 1, and wherein said sealing means comprises a plurality of spaced resilient deformable sealing rings mounted on the tubular body.

6. The filter device of claim 5, and wherein the tubular body is provided with inwardly deformed annular channels receiving the sealing rings.

7. The filter device of claim 6, and wherein at least one of the sealing rings is located adjacent the bottom end of the tubular body and another sealing ring is spaced a substantial distance above the bottom end of the tubular body.

8. The filter device of claim 7, and wherein the sealing rings are generally trapezoidal in cross-section and have downwardly flaring outer surfaces.

9. The filter device of claim 8, and wherein there are a pair of relatively closely spaced sealing rings adjacent the bottom end of the tubular body and a third sealing ring spaced a substantial distance above said pair of closely spaced sealing rings.

10. The filter device of claim 9, and wherein said porous wall portion comprises a circular disc of porous sintered glass material rigidly secured to the bottom end of the tubular body.

11. The filter device of claim 1, and wherein said porous wall portion comprises a cup-shaped member of porous material secured on the lower end of said tubular body.

12. The filter device of claim 11, and wherein said tubular body is provided with a depending fastening portion and the top of said cup-shaped member is lockingly secured to said depending fastening portion.

13. The filter device of claim 12, and wherein said fastening portion comprises a reduced stud member provided with annular sealing means lockingly and sealingly engaged with the top of the cup-shaped member.

14. The filter device of claim 13, and wherein said stud member is formed with an annular groove and said annular sealing means comprises a resilient deformable ring member seated in said annular groove.

15. The filter device of claim 11, and wherein said tubular body is provided with downwardly facing, outwardly projecting stop means engageable with the top rim of the test tube to limit downward movement of the tubular body therein.

16. The filter device of claim 12, and wherein said tubular body is provided with a relatively thick bottom wall portion and wherein said fastening portion depends from said relatively thick bottom wall portion.

17. The filter device of claim 11, and wherein the lower end of said body is formed with a downwardly facing annular recess lockingly receiving the peripheral wall portion of the cup-shaped member.

18. The filter device of claim 17, and wherein a wall of the annular recess is formed with a projection to frictionally grip the peripheral wall portion of the cup-shaped member.

19. The filter device of claim 1, and wherein said sealing means comprises a peripheral rib integrally formed on the body.

20. In combination, a test tube and a tubular body telescopically received in the test tube, said tubular body having an imperforate wall portion made of porous material for the transfer of filtrate between the interior of the test tube and the interior of the body.

References Cited

UNITED STATES PATENTS 1,643,531    9/1927    Wolf _____ 128—220

OTHER REFERENCES

Arthur et al.: Semimicro Qualitative Analysis, McGraw-Hill, 1952, pp. 165 to 168 relied on.

MORRIS O. WOLK, Primary Examiner

R. M. REESE, Assistant Examiner

U.S. Cl. X.R.

73—61; 128—220; 210—450, 459; 222—189